US012710384B2

(12) United States Patent
Hong et al.

(10) Patent No.: US 12,710,384 B2
(45) Date of Patent: Aug. 18, 2026

(54) APPARATUS AND METHOD FOR DETECTING FOREIGN SUBSTANCE

(71) Applicants: Silicon Mitus, Inc., Seongnam-si (KR); SILICON-MAGIC SEMICONDUCTOR TECHNOLOGY (HANGZHOU) CO., LTD., Hangzhou (CN)

(72) Inventors: Chang Ki Hong, Yongin-si (KR); Chang Sub Park, Seoul (KR); Young Seok Ko, Seoul (KR)

(73) Assignees: Silicon Mitus, Inc., Gyeonggi-do (KR); SILICON-MAGIC SEMICONDUCTOR TECHNOLOGY (HANGZHOU) CO., LTD., Hangzhou (CN)

( * ) Notice: Subject to any disclaimer, the term of this patent is extended or adjusted under 35 U.S.C. 154(b) by 236 days.

(21) Appl. No.: 17/909,692

(22) PCT Filed: Mar. 3, 2021

(86) PCT No.: PCT/KR2021/002605
§ 371 (c)(1),
(2) Date: Sep. 6, 2022

(87) PCT Pub. No.: WO2021/177715
PCT Pub. Date: Sep. 10, 2021

(65) Prior Publication Data

US 2025/0389682 A1 Dec. 25, 2025

(30) Foreign Application Priority Data

Mar. 5, 2020 (KR) ........................ 10-2020-0027750

(51) Int. Cl.
*G01N 27/04* (2006.01)

(52) U.S. Cl.
CPC ......... *G01N 27/045* (2013.01); *G01N 27/048* (2013.01)

(58) Field of Classification Search
CPC ........................... G01N 27/045; G01N 27/048
See application file for complete search history.

(56) References Cited

U.S. PATENT DOCUMENTS

2017/0110835 A1* 4/2017 Hasegawa .......... H01R 13/6683
2018/0018934 A1* 1/2018 Lim .................... G06F 13/4022
(Continued)

FOREIGN PATENT DOCUMENTS

KR 10-2014-102389 A 8/2014
KR 10-2019-028953 A 3/2019
(Continued)

OTHER PUBLICATIONS

PCT/KR2021/002605 International Search Report mailed Jul. 1, 2021, English Translation.

*Primary Examiner* — Eman A Alkafawi
*Assistant Examiner* — Suresh K Rajaputra
(74) *Attorney, Agent, or Firm* — Osha Bergman Watanabe & Burton LLP

(57) ABSTRACT

The present invention relates to an apparatus for detecting a foreign substance or a device on a connector and a method for detecting therefor. According to one embodiment of the present invention, the apparatus for detecting the foreign substance or the device on the connector which has one or more pin includes: a current source for supplying different levels of detection currents to any one of the pins (first pin) of the connector; a detection circuit for detecting a voltage of the first pin; and a detection controller for controlling the levels of the detection currents supplied to the first pin and the supply time points thereof and for detecting the foreign substance or the device attached to the connector by mea- (Continued)

suring the voltage of the first pin input from the detection circuit according to the detection controller.

17 Claims, 9 Drawing Sheets

(56) References Cited

U.S. PATENT DOCUMENTS

| | | | | |
|---|---|---|---|---|
| 2019/0011386 | A1* | 1/2019 | Park | G01N 27/048 |
| 2019/0079123 | A1* | 3/2019 | Kim | G01R 31/68 |
| 2019/0302047 | A1* | 10/2019 | Park | G01N 27/223 |
| 2020/0333382 | A1* | 10/2020 | Lee | G01R 31/58 |
| 2021/0305805 | A1* | 9/2021 | Kim | H02H 5/083 |

FOREIGN PATENT DOCUMENTS

| | | | |
|---|---|---|---|
| KR | 10-2019-029281 | A | 3/2019 |
| KR | 10-2019-113501 | A | 10/2019 |
| KR | 10-2020-017251 | A | 2/2020 |
| WO | WO2021/0177715 | A1 | 9/2021 |

* cited by examiner

APPARATUS AND METHOD FOR DETECTING FOREIGN SUBSTANCE

TECHNICAL FIELD

The present invention relates to an apparatus for detecting a foreign substance or a device on a connector and a method therefor.

BACKGROUND ART

Some electronic apparatuses communicate with external electronic apparatuses or supply power through cables connected to the connectors on these devices. In those cases, current flows through the connectors, and when foreign substances such as moisture are introduced into the connectors, some pins may be short-circuited, corroded or damaged, and in some cases, excessive power consumption may occur. In addition, when a non-rated device is connected to the connector, the connected non-rated device may be incorrectly recognized and malfunction. As a result, there is a need for an effective method capable of accurately recognizing a device connected to the connector and also detecting the presence of foreign substances introduced into the connector.

CITATION LIST

Patent Literature (Patent Literature 1) Korean Patent Laid-Open Publication No. 10-2019-0113501

SUMMARY OF THE DISCLOSURE

The present invention provides an apparatus for detecting a foreign substance and a method therefor, capable of detecting the presence or the kind of a foreign substance introduced into a connector on the apparatus to prevent corrosion or damage of the connector due to the foreign substance, according to an embodiment.

The present invention provides an apparatus for detecting a foreign substance and a method therefor that is capable of detecting the presence or the kind of an external device connected to the connector on the apparatus, according to an embodiment.

The present invention provides an apparatus for detecting a foreign substance and method therefor, capable of checking a removal state of a foreign substance or a device on a connector, according to an embodiment.

In order to solve the above-mentioned problems in the Background Arts, according to an aspect of the present invention, there is provided a foreign substance detection apparatus for detecting a foreign substance or a device on a connector including at least one pin, the apparatus including: a current source for supplying different levels of detection currents to any one pin (first pin) of the connector; a detection circuit for detecting a voltage of the first pin; and a detection controller for controlling the levels of the detection currents supplied to the first pin and supply time points thereof and detecting a foreign substance or a device attached to the connector by measuring the voltage of the first pin input from the detection circuit according to the control.

In the foreign substance detection apparatus, the detection controller may determine that a power supply device is connected to the first pin when a pull-down voltage ($V_S$) of the first pin measured with a pull-down resistor being connected to the first pin is greater than a first threshold value.

In the foreign substance detection apparatus, the detection controller may start a connection state determination subroutine when a first voltage ($V_{S1}$) of the first pin measured for a first current ($I_1$) supplied to the first pin is smaller than a second threshold value.

In the foreign substance detection apparatus, the detection controller may measure each of a second voltage ($V_{S2}$) of the first pin for a second current ($I_2$) and a third voltage ($V_{S3}$) thereof for a third current ($I_3$) through the detection circuit while sequentially supplying the second current ($I_2$) and the third current ($I_3$) to the first pin through the current source in the connection state determination subroutine, determine whether or not a substance attached to the first pin is a resistance component based on a ratio of the second current ($I_2$) to the third current ($I_3$) and a ratio of the second voltage ($V_{S2}$) to the third voltage ($V_{S3}$), start a rated device determination subroutine for determining whether or not a rated device is connected when the substance is the resistance component, and determine that the substance attached to the first pin is not the rated device when the substance is not the resistance component.

In the foreign substance detection apparatus, the detection controller may supply a fourth current ($I_4$) to the first pin through the current source, measure, through the detection circuit, a fourth-first voltage ($V_{S4\text{-}1}$) of the first pin at a first time point after supplying the fourth current ($I_4$) and a fourth-second voltage ($V_{S4\text{-}2}$) of the first pin at a second time point after supplying the fourth current ($I_4$), and determine whether or not a rated device is connected based on a magnitude of the resistance component calculated using the fourth current ($I_4$) and the fourth-second voltage ($V_{S4\text{-}2}$) and a difference between the fourth-first voltage ($V_{S4\text{-}1}$) and the fourth-second voltage ($V_{S4\text{-}2}$).

In the foreign substance detection apparatus, the detection controller may determine that the rated device is connected to the first pin when the magnitude of the resistance component calculated using the fourth current ($I_4$) and the fourth-second voltage ($V_{S4\text{-}2}$) belongs to a resistance magnitude region of the rated device and a value obtained by subtracting the fourth-first voltage ($V_{S4\text{-}1}$) from the fourth-second voltage ($V_{S4\text{-}2}$) is not greater than a fourth threshold value.

In the foreign substance detection apparatus, the detection controller may cut off the current supplied to the first pin through the current source, detect a first cut-off voltage ($V_{STP\text{-}1}$) of the first pin at a first cut-off time point and a second cut-off voltage ($V_{STP\text{-}2}$) of the first pin at a second cut-off time point through the detection circuit, determine that a foreign substance other than moisture is attached to the first pin when the second cut-off voltage ($V_{STP\text{-}2}$) is not greater than a fifth threshold value, and determine that moisture is attached to the first pin when a difference between the first cut-off voltage ($V_{STP\text{-}1}$) and the second cut-off voltage ($V_{STP\text{-}2}$) is greater than a sixth threshold value.

In the foreign substance detection apparatus, when it is determined that the substance attached to the first pin is not a rated device, the detection controller may sequentially supply a fifth current ($I_5$) and a sixth current ($I_6$) to the first pin, detect a fifth voltage ($V_{S5}$) for the fifth current ($I_5$) and a sixth voltage ($V_{S6}$) for the sixth current ($I_6$), calculate a resistance value in each of the fifth current ($I_5$) and the sixth current ($I_6$), and determine that a device in a dead battery state is connected to the first pin when a resistance value for a relatively large current among the fifth current ($I_5$) and the sixth current ($I_6$) is relatively small.

According to another aspect of the present invention, there is provided a foreign substance detection method for detecting a foreign substance that is performed by a foreign substance detection apparatus for detecting a foreign substance or a device on a connector, the method including: a first step of determining whether or not a power supply device is connected to the connector based on a full-down voltage ($V_S$) of the first pin measured with a pull-down resistor being connected to any one pin (first pin) of the connector; a second step of determining whether or not to enter a connection state determination subroutine based on a first voltage ($V_{S1}$) of the first pin measured for a first current ($I_1$) supplied to the first pin; and a third step of determining whether or not a substance attached to the first pin is a resistance component based on a second voltage ($V_{S2}$) and a third voltage ($V_{S3}$) of the first pin measured for a second current ($I_2$) and a third current ($I_3$) sequentially supplied to the first pin in the connection state determination subroutine, and determining whether or not to start a rated device determination subroutine for determining whether or not a rated device is connected to the first pin depending on the determination for the resistance component.

In the foreign substance detection method, in the first step, it may be determined that a power supply device is connected to the first pin when the pull-down voltage ($V_S$) is greater than a first threshold value, and the method may proceed to the second step when the pull-down voltage ($V_S$) of the first pin is not greater than the first threshold value.

In the foreign substance detection method, in the second step, the method may proceed to the third step when the first voltage ($V_{S1}$) of the first pin is smaller than a second threshold value, and the method may return to the first step when the first voltage ($V_{S1}$) is not smaller than the second threshold value.

In the foreign substance detection method, in the third step, the rated device determination subroutine may be performed when a difference between a ratio of the second current ($I_2$) to the third current ($I_3$) and a ratio of the second voltage ($V_{S2}$) to the third voltage ($V_{S3}$) is smaller than a third threshold value, and a determination may be made as to whether or not a device connected to the first pin is in a dead battery state when the difference between the ratio of the second current ($I_2$) to the third current ($I_3$) and the ratio of the second voltage ($V_{S2}$) to the third voltage ($V_{S3}$) is not smaller than the third threshold value.

In the foreign substance detection method, the rated device determination subroutine may further include a fourth step of supplying a fourth current ($I_4$) to the first pin, and determining whether or not a rated device is connected to the first pin based on a fourth-first voltage ($V_{S4-1}$) of the first pin at a first time point after supplying the fourth current ($I_4$) and a fourth-second voltage ($V_{S4-2}$) of the first pin at a second time point after supplying the fourth current ($I_4$).

In the foreign substance detection method, in the fourth step, it may be determined that the rated device is connected to the first pin when a magnitude of the resistance component calculated using the fourth current ($I_4$) and the fourth-second voltage ($V_{S4-2}$) belongs to a resistance magnitude region of the rated device and a value obtained by subtracting the fourth-first voltage ($V_{S4-1}$) from the fourth-second voltage ($V_{S4-2}$) is not greater than a fourth threshold value.

In the foreign substance detection method, in the fourth step, a fifth step may be further performed when the magnitude of the resistance component calculated using the fourth current ($I_4$) and the fourth-second voltage ($V_{S4-2}$) does not belong to the resistance magnitude region of the rated device or the value obtained by subtracting the fourth-first voltage ($V_{S4-1}$) from the fourth-second voltage ($V_{S4-2}$) is greater than the fourth threshold value, and the fifth step may include cutting off the current supplied to the first pin, detecting a first cut-off voltage ($V_{STP-1}$) of the first pin at a first cut-off time point and a second cut-off voltage ($V_{STP-2}$) of the first pin at a second cut-off time point, determining that a foreign substance other than moisture is attached to the first pin when the second cut-off voltage ($V_{STP-2}$) is not greater than a fifth threshold value, and determining that moisture is attached to the first pin when a difference between the first cut-off voltage ($V_{STP-1}$) and the second cut-off voltage ($V_{STP-2}$) is greater than a sixth threshold value.

In the foreign substance detection method, the determining of whether or not the device connected to the first pin is in the dead battery state may include sequentially supplying a fifth current ($I_5$) and a sixth current ($I_6$) to the first pin, detecting a fifth voltage ($V_{S5}$) for the fifth current ($I_5$) and a sixth voltage ($V_{S6}$) for the sixth current ($I_6$), calculating a resistance value in each of the fifth current ($I_5$) and the sixth current ($I_6$), and determining that a device in a dead battery state is connected to the first pin when a resistance value for a relatively large current among the fifth current ($I_5$) and the sixth current ($I_6$) is relatively small.

Advantageous Effects

According to embodiments of the present invention, it is possible to detect the presence or the kind of a foreign substance introduced into a connector in order to prevent the connector from being corroded or damaged due to the foreign substance.

According to embodiments of the present invention, it is possible to detect the presence or the kind of an external device connected to the connectors.

According to embodiments of the present invention, it is possible to check the removal state of foreign substances or a device on the connector.

EMBODIMENTS OF THE DISCLOSURE

Figure 1:
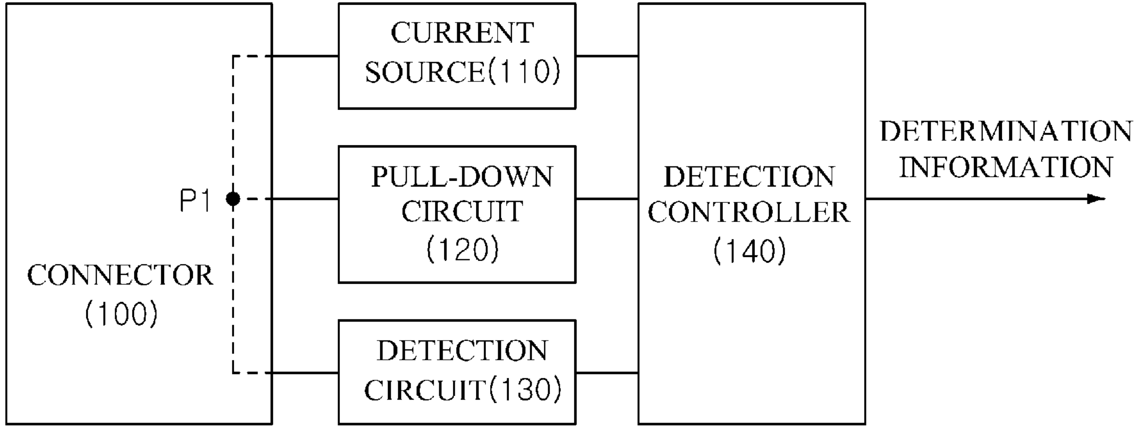
FIG. 1 illustrates a block configuration of an apparatus for detecting a foreign substance according to an embodiment of the present disclosure.

Hereinafter, some embodiments of the present invention will be described in detail with reference to exemplary drawings. In adding reference numerals to the components of each drawing, it should be noted that the same components are given the same reference numerals as much as possible even though they are shown on different drawings.

Furthermore, in the description of the present invention, if it is determined that the detailed description of the known technology related to the present invention may unnecessarily obscure the subject matter of the present invention, the detailed description thereof will be omitted.

In addition, in describing a component of the present invention, terms such as first, second, A, B, (a), (b), etc. may be used. These terms are only for distinguishing the component from other components, and the essence, sequence, or order of the component is not limited by the terms. When a component is described as being "connected", "coupled" or "linked" to another component, it should be understood that the component may be directly connected to or linked to the other component, or yet another component may be "connected," "coupled," or "linked" between the components.

Figure 2:
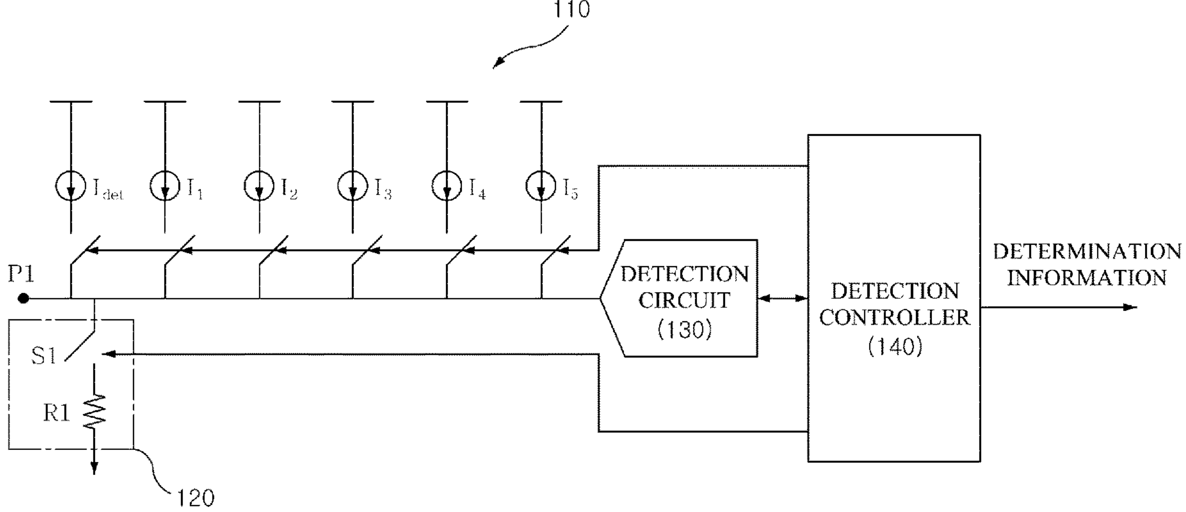
FIGS. 2 and 3 illustrate block configurations of the apparatus for detecting a foreign substance according to an embodiment of the present disclosure.
Figure 3:
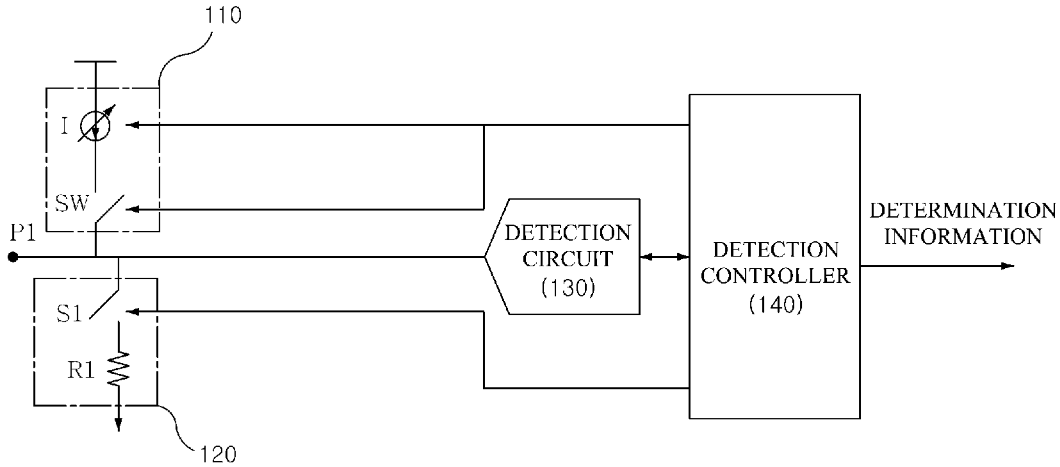

FIG. 1 illustrates a block configuration of an apparatus for detecting a foreign substance according to an embodiment of the present invention, and FIGS. 2 and 3 illustrate detailed configurations of the apparatus for detecting a foreign substance according to an embodiment of the present invention.

The apparatus for detecting a foreign substance (foreign substance detection apparatus) according to an embodiment of the present invention shown in FIGS. 1 to 3 may be mounted on electronic devices such as desktop PCs and servers as well as portable electronic devices such as smartphones, tablet PCs, PDAs, MP3 players, digital cameras, and netbook computers to detect foreign substances or devices on the connector. According to an embodiment, the foreign substance detection apparatus may selectively detect at least a part of the presence or the kind of a foreign substance attached to the connector, and the presence or the kind of a device. In the present specification, for convenience of description, the apparatus and the method according to the present invention are briefly referred to as 'foreign substance detection apparatus' or 'foreign substance detection method', respectively, but the use of the term should not be construed as liming that the foreign substance detection apparatus or method according to the present embodiment is applied only to the detection of a 'foreign substance', and it should be understood that, in some cases, a function for detecting the present or the kind of a device may be included.

The foreign substance detection apparatus may be implemented as a separate apparatus or may be implemented inside an apparatus that performs other functions. For example, the foreign substance detection apparatus may be implemented inside a power management chip used in a smartphone.

Referring to FIG. 1, the foreign substance detection apparatus may selectively include a current source 110, a pull-down circuit 120, a detection circuit 130, and a detection controller 140. It may be understood that a connector 100 is not included in the foreign substance detection apparatus, but in some cases, the connector 100 may be regarded as one component of the foreign substance detection apparatus.

The connector 100 may include at least one pin. The connector 100 may be a general connection means used to transmit an electrical signal or electrical energy. According to an embodiment, the connector 100 may be a USB type-C or USB power delivery (PD) type-C connector in which a plurality of pins are formed as a connector for performing communication or supplying power between an external device and the electronic device. This is an example, and the foreign substance detection apparatus and method according to an embodiment of the present invention may be equally or similarly applied to connectors having various structures as well as other types of USB connectors.

The current source 110 may supply a current to the pin of the connector 100. According to an embodiment, the current source 110 may supply different levels of detection currents to any one pin of the connector (hereinafter, referred to as a 'first pin (P1)').

According to the embodiment, the current source 110 may be implemented to include a plurality of unit current sources $I_{det}$ and $I_1$ to $I_5$ capable of supplying different levels of currents, as illustrated in FIG. 2, and supply various current levels using switches for determining supply of each of the unit current sources $I_{det}$, and $I_1$ to $I_5$.

According to an embodiment, the current source 110 may be implemented by using a controllable variable current source I capable of adjusting the current level and a switch, as illustrated in FIG. 3. In this case, the level of the current supplied by the variable current source I and a supply time point thereof may be controlled by the detection controller 140.

The pull-down circuit 120 may pull down the node connected to the first pin P1. For example, the pull-down circuit 120 may connect the first pin P1 to a reference potential (e.g., ground) through a predetermined resistor. According to an embodiment, the pull-down circuit 120 may include a pull-down resistor R1 and a pull-down switch S1, as illustrated in FIG. 2.

The detection circuit 130 may detect the voltage of the first pin P1. The detection circuit 130 may include a digital conversion means such as an analog-digital converter (ADC) to convert the detected voltage of the first pin P1 to a digital value.

The detection controller 140 may control the level and supply time point of the detection current supplied to the first pin P1 through the current source 110 and measure the voltage of the first pin P1 input from the detection circuit according to the control to determine whether or not a foreign substance is attached to the connector 100, what kind of the attached foreign substance is, whether or not an external device is connected, or what kind of the connected external device is.

When moisture or a foreign substance other than moisture are introduced into the connector 100 or an external device is connected, the resistance value detected from the pin is changed accordingly, and thus the voltage measured at the pin may be changed. The detection controller 140 monitors the change in the voltage of the pin to determine the presence/kind of introduced foreign substance or the presence/kind of connected external device, and transmits determination information to the processor of the electronic device, or the detection controller 140 may directly output the determination information as visual or auditory (alarm) expression data through a display device or an audio output device.

According to an embodiment, the detection controller 140 may determine that a power supply device is connected to the first pin P1 when the pull-down voltage $V_S$ of the first pin P1 measured with the pull-down resistor R1 being connected to the first pin P1 is greater than a first threshold value.

According to an embodiment, the detection controller 140 may start a connection state determination subroutine when a first voltage $V_{S1}$ of the first pin measured for the first current $I_1$ supplied to the first pin P1 is smaller than a second threshold value.

According to an embodiment, the detection controller 140 may measure a second voltage $V_{S2}$ and a third voltage $V_{S3}$ of the first pin P1 through the detection circuit 130 while sequentially supplying the second current $I_2$ and the third current $I_3$ to the first pin P1 through the current source 110 in the connection state determination subroutine, determine whether or not a substance attached to the first pin P1 is a resistance component based on a ratio of the second current $I_2$ to the third current $I_3$ and a ratio of the second voltage $V_{S2}$ to the third voltage $V_{S3}$, start a rated device determination subroutine for determining whether or not a rated device is connected when the substance is the resistance component, and determine that a device connected to the first pin P1 is not the rated device when the substance is not the resistance component.

According to an embodiment, the detection controller 140 may supply a fourth current $I_4$ to the first pin P1 through the current source 110, measure, through the detection circuit 130, a fourth-first voltage $V_{S4-1}$ of the first pin P1 at a first time point after supplying a fourth current $I_4$ and a fourth-second voltage $V_{S4-2}$ of the first pin P1 at a second time point after supplying the fourth current $I_4$, and determine whether or not a rated device is connected based on a magnitude of the resistance component calculated using the fourth current $I_4$ and the fourth-second voltage $V_{S4-2}$ and a difference between the fourth-first voltage ($V_{S4-1}$) and the fourth-second voltage $V_{S4-2}$.

According to an embodiment, the detection controller 140 may determine that the rated device is connected to the first pin P1 when a magnitude of the resistance component calculated using the fourth current $I_4$ and the fourth-second voltage $V_{S4-2}$ belongs to a resistance magnitude region of the rated device and a value obtained by subtracting the fourth-first voltage $V_{S4-1}$ from the fourth-second voltage $V_{S4-2}$ is not greater than a fourth threshold value.

According to an embodiment, the detection controller 140 may cut off the current supplied to the first pin P1 through the current source 110, detect a first cut-off voltage $V_{STP-1}$ of the first pin P1 at a first cut-off time point and a second cut-off voltage $V_{STP-2}$ of the first pin at a second cut-off time point through the detection circuit 130, determine that a foreign substance other than moisture is attached to the first pin P1 when the second cut-off voltage $V_{STP-2}$ is not greater than a fifth threshold value, and determine that moisture is attached to the first pin P1 when a difference between the first cut-off voltage $V_{STP-1}$ and the second cut-off voltage $V_{STP-2}$ is greater than a sixth threshold value.

According to an embodiment, the detection controller 140 may sequentially supply a sixth current $I_6$ and a seventh current $I_7$ to the first pin P1, detect a sixth voltage $V_{S6}$ for the sixth current $I_6$ and a seventh voltage $V_{S7}$ for the seventh current $I_7$, calculate a resistance value in each of the sixth current $I_6$ and the seventh current $I_7$, and determine that a device connected to the first pin P1 is in a dead battery state when a resistance value for a relatively large current among the sixth current $I_6$ and the seventh current $I_7$ is relatively small.

According to an embodiment, when it is determined that a foreign substance is introduced into the connector 100, the detection controller 140 may measure the voltage of the first pin P1 by periodically supplying a detection current to the first pin P1, determine that the foreign substance is removed when the measured voltage is equal to or greater than a predetermined voltage, and output information indicating the above or transmit the information to the processor of the electronic device.

According to an embodiment, the detection controller 140 may allow the user to take a necessary action by transmitting information on each of above-mentioned determinations to the processor of the electronic device, or directly outputting it as visual or auditory (alarm) expression data through a display device or an audio output device.

According to an embodiment, the detection controller 140 may be implemented in hardware in an integrated circuit. Alternatively, the detection controller 140 may be implemented in software. In this case, the function of the detection controller 140 may be performed by the processor in a state of being stored in a computer-readable storage medium. According to an embodiment, the detection controller 140 may be implemented through a processor that controls overall operations in an electronic device such as a smartphone.

FIGS. 4 to 7 illustrate a method for detecting a foreign substance according to an embodiment of the present invention. The method of FIGS. 4 to 7 may be performed by the foreign substance detection apparatus described with reference to FIGS. 1 to 3.

Figure 4:
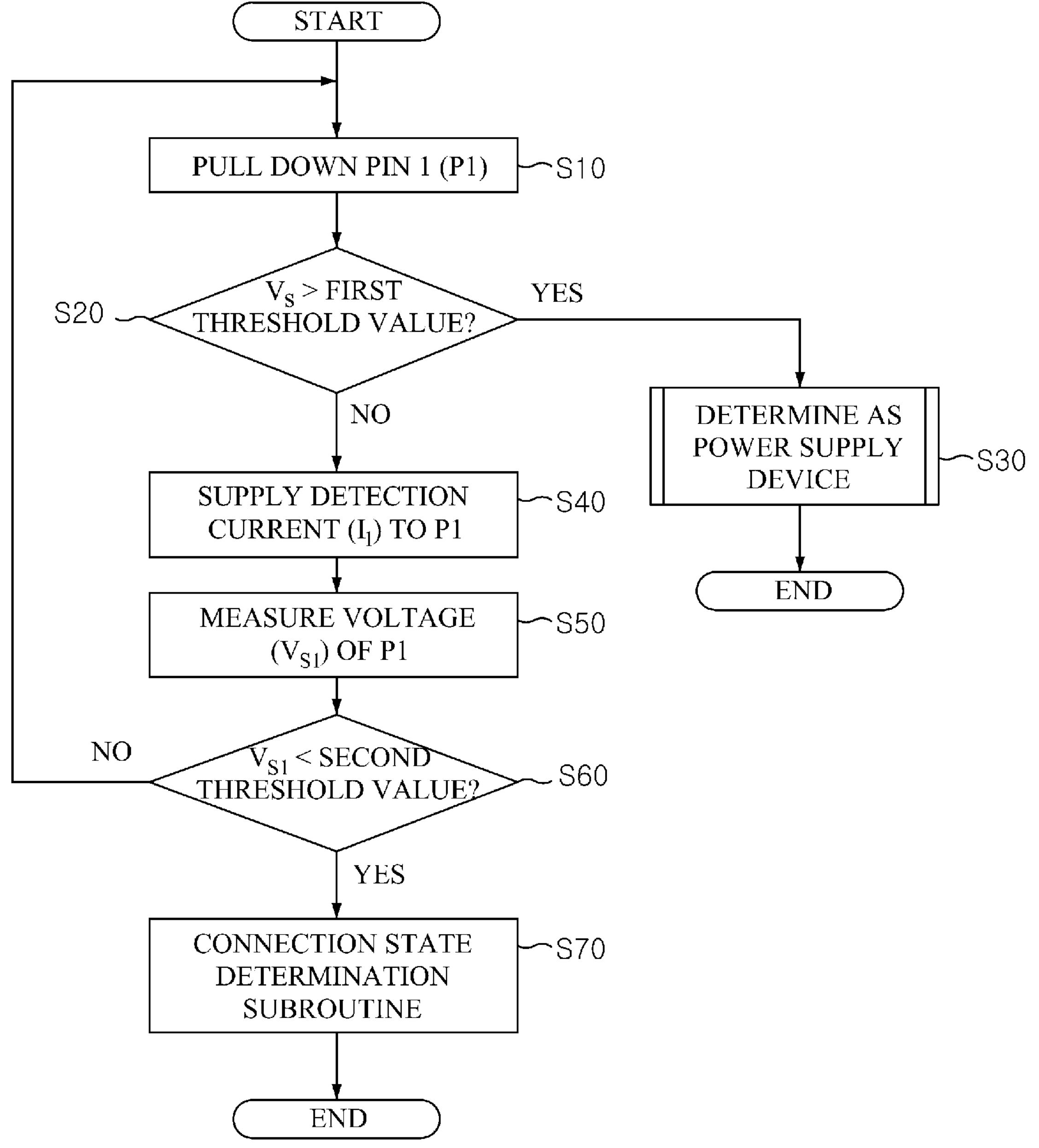
FIGS. 4 to 7 illustrate flow charts of methods for detecting a foreign substance according to other embodiments of the present disclosure.

Referring to FIG. 4, the detection controller 140 may periodically pull down the first pin P1 of the connector 100 to detect the connection of a device supplying power from the outside, such as a charger, to the connector 100 (step S10).

When the pull-down resistor R1 is connected to the first pin P1 and the pull-down voltage $V_S$ of the first pin P1 is equal to or greater than a predetermined voltage (first threshold value) (step S20), the detection controller 140 may determine that a power supply device is connected to the connector 100 (step S30). This is because, when the detection controller 140 does not supply current through the current source 110 and the pull-down voltage $V_S$ of the first pin P1 is greater than the first threshold value in a state in which the first pin P1 is connected to the reference potential through the pull-down resistor, it may be seen that an external energy source is connected to the first pin P1. The determination result may be transmitted to the processor of the electronic device as determination information, and the determination information may be displayed through a display unit.

If the pull-down voltage $V_S$ of the first pin P1 is not greater than the first threshold value, the detection controller 140 may supply a first level of first current $I_1$ to the first pin P1 to determine whether or not a foreign substance is introduced into the first pin P1 of the connector 100 or an external device is connected to the first pin P1 (step S40).

The detection controller 140 that supplies the first current $I_1$ to the first pin P1 of the connector 100 may measure the first voltage $V_{S1}$ of the first pin P1 through the detection circuit 130 (step S50), and when the measured first voltage $V_{S1}$ of the first pin P1 is less than or equal to the second threshold value (in step S60), the process may proceed to step S70 to execute the 'connection state determination subroutine', and when the first voltage $V_{S1}$ of the first pin $P_1$ is equal to or greater than the second threshold value, the process may return to step S10. This is because when the first voltage $V_{S1}$ of the first pin P1 does not rise to or above a reference value (second threshold value) despite supplying the first current $I_1$ to the first pin P1, it may be determined that a foreign substance is introduced or that an external device is connected.

Figure 5:
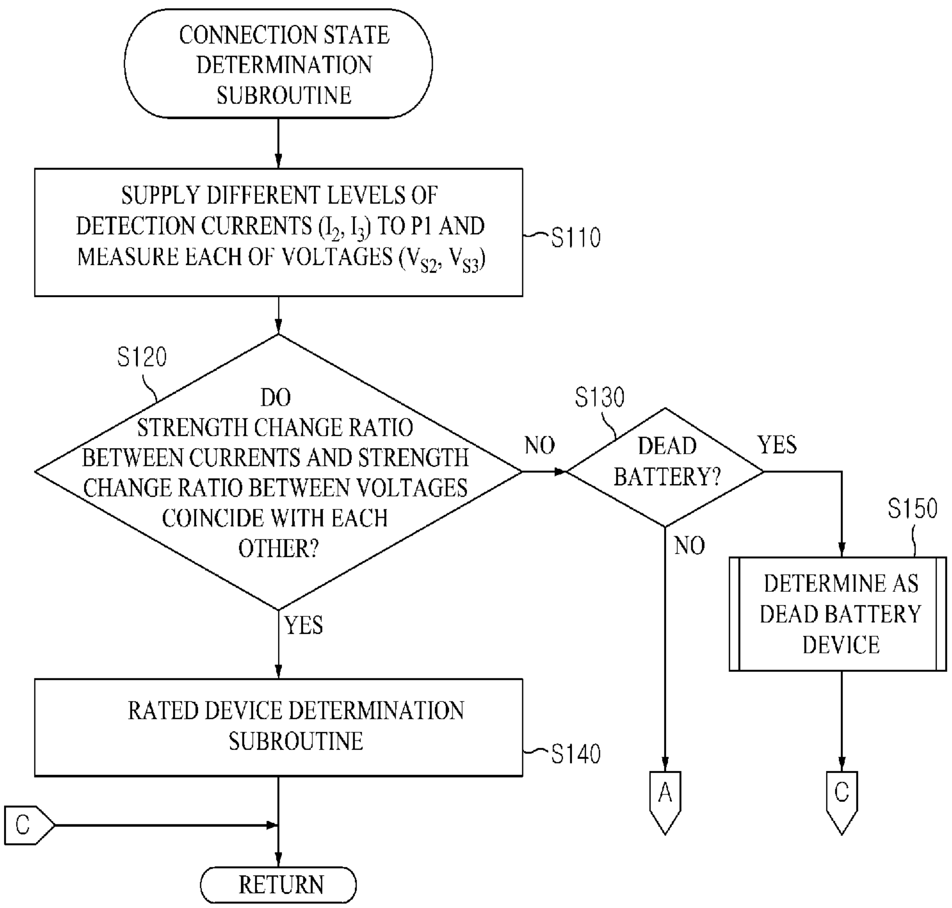

FIG. 5 is an example of the connection state determination subroutine mentioned in FIG. 4.

Referring to FIG. 5, the detection controller 140 controls the current source 110 to sequentially supply the second current $I_2$ and the third current $I_3$ of different levels to the first pin P1 of the connector 100 for a predetermined time, and measures each of the second voltage $V_{S2}$ and the third voltage $V_{S3}$ of the first pin P1 when the second current $I_2$ and the third current $I_3$ are sequentially supplied (step S110). The voltage of the first pin P1 measured when the second current $I_2$ is supplied is referred to as the second voltage $V_{S2}$, and the voltage of the first pin P1 measured when the third current $I_3$ is supplied is referred to as the third voltage $V_{S3}$.

Then, the detection controller 140 may compare a strength change ratio of the sequentially supplied second current $I_2$ to third current $I_3$ and a strength change ratio of the second voltage $V_{S2}$ to the third voltage $V_{S3}$ to check whether or not the change ratios coincide with each other (step S120). Here, it may be understood that a difference in the degree that may be regarded as substantially consistent is allowed in the determining of whether or not the change ratios coincide with each other. Illustratively, the determination as to whether or not the strength change ratio of the second current $I_2$ to the third current $I_3$ and the strength change ratio of the second voltage $V_{S2}$ to the third voltage $V_{S3}$ coincide with each other may be made as in the same manner as in Equation 1 or Equation 2 below, but is not limited thereto.

$$V_{s3} \geq V_{s2} \times \frac{I_3}{I_2} \times M \quad \text{[Equation 1]}$$

$$V_{s2} \times \frac{I_3}{I_2} \times M_1 \geq V_{s3} \geq V_{s2} \times \frac{I_3}{I_2} \times M_2 \quad \text{[Equation 2]}$$

Here, M, $M_1$, and $M_2$ may be understood as margins for giving a tolerance for determining whether or not the change ratios coincide with each other, respectively.

In general, when the component connected to the connector 100 is a resistance component, the strength change ratio between currents and the change ratio between the voltages coincide with each other with the formula of V=IR satisfied for each current strength, and when the component connected to the connector 100 is not a resistance component, the strength change ratio between currents and the change ratio between voltages do not coincide with each other. In the case of a typical rated device, the characteristic detected from the pin of the connector 100 is similar to the resistance, whereas in the case of a foreign substance or the like, the strength change ratio between currents and the change ratio between voltages may not coincide with each other.

Therefore, through the determination as to whether or not the strength change ratio between currents and the change ratio between voltages coincide with each other, it may be primarily determined whether or not a rated device corresponding to the resistance component is connected to the connector 100 or whether or not a foreign substance or the like is introduced. Here, the use of the expression 'primarily determined' may be understood to mean that an additional procedure as illustrated in FIG. 6 or 7 may be further performed in order to more accurately determine whether or not a rated device is connected or a foreign substance is introduced.

Figure 6:
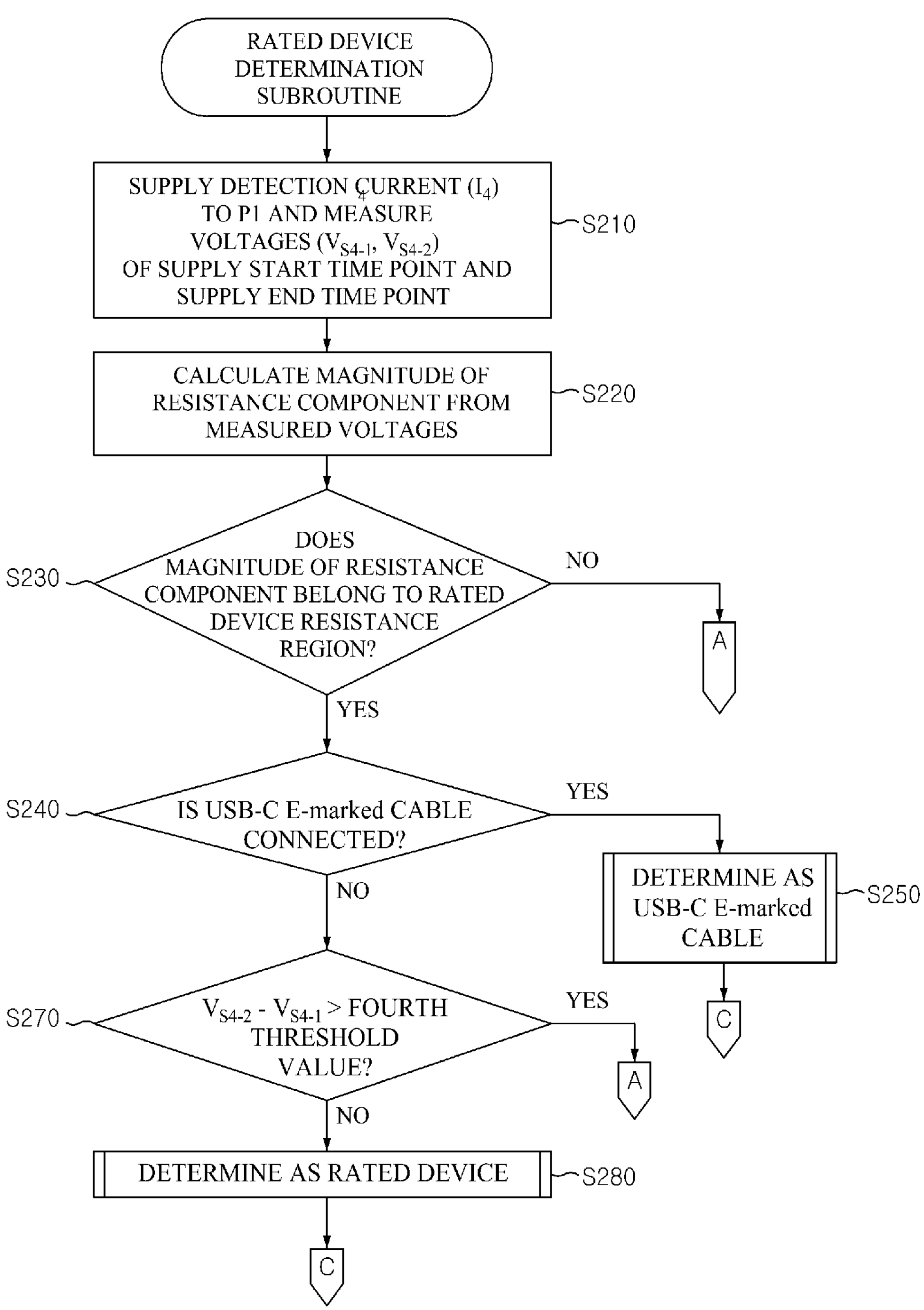

That is, by using Equation 1 or Equation 2, the determination is made whether or not the strength change ratio between currents and the change ratio between voltages coincide with each other (step S120), and when they coincide with each other, the rated device is likely to be connected, and accordingly, for more precise determination, the rated device determination subroutine illustrated in FIG. 6 may be started (step S140).

Figure 7:
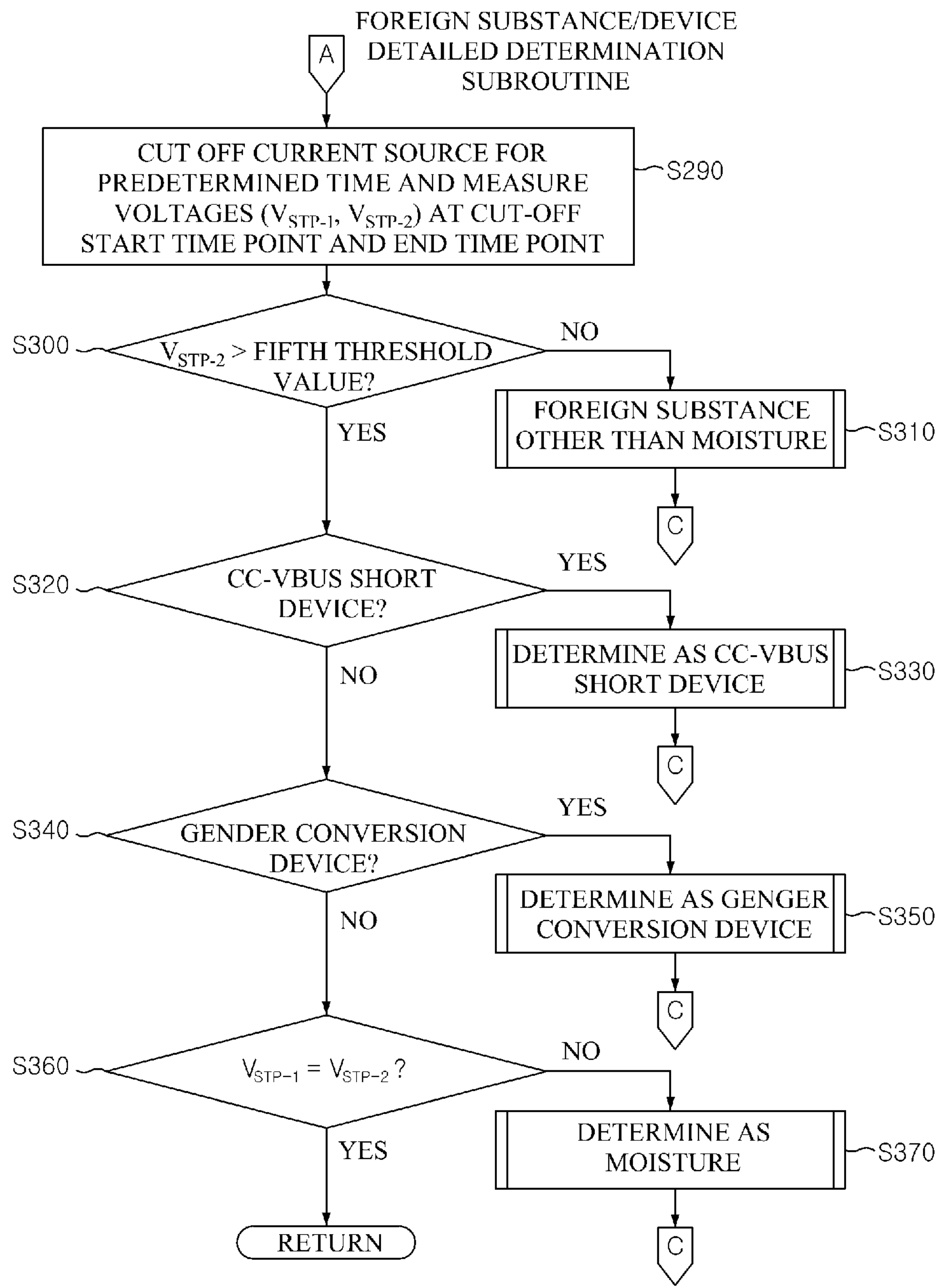

When the strength change ratio between currents and the change ratio between voltages do not coincide with each other, it may be determined that the device connected to the first pin P1 is not a rated device, and the procedure may be proceed to a step of determining the kind of a foreign substance or other device (proceeds to FIG. 7 through 'A').

In this case, before proceeding to the step of determining the kind of foreign substance or other device in FIG. 7, it may be optionally first determined whether or not a device in a dead battery state is connected to the first pin P1 (step S130). Here, the dead battery state may be understood to mean a state in which a normal operation is difficult because the battery is completely discharged or has a low voltage.

As one example of a method of determining whether or not the device connected to the first pin P1 is in the dead battery state, the detection controller 140 may sequentially supply a fifth current $I_5$ and a sixth current $I_6$ to the first pin P1, detect a fifth voltage $V_{S5}$ for the fifth current $I_5$ and a sixth voltage $V_{S6}$ for the sixth current ($I_6$), calculate a resistance value in each of the fifth current $I_5$ and the sixth current $I_6$, and determine that a device in the dead battery state is connected to the first pin P1 when a resistance value for a relatively large current among the fifth current $I_5$ and the sixth current $I_6$ is relatively small (step S150). Illustratively, when the sixth current $I_6$ is greater than the fifth current $I_5$ and the resistance value for the sixth current $I_6$ is smaller than the resistance value for the fifth current $I_5$, the device is determined as being in the dead battery state.

In this case, in order to reduce the number of times of application of the current, the detection controller 140 may utilize the voltage measured from the previously applied current. For example, the detection controller 140 may use at least one of the second current $I_2$ and the third current $I_3$ applied in step S110. Alternatively, for example, the fourth current $I_4$, which will be described later with reference to FIG. 6, may be continuously applied following the second current $I_2$ and the third current $I_3$ in step S110 to measure the voltage, and in step S130, the fifth current $I_5$ may be continuously applied following the fourth current $I_4$, such that the state of the dead battery may be determined by using the fourth current $I_4$ and the fifth current $I_5$. That is, although it has been described above that the fifth current $I_5$ and the sixth current $I_6$ are used to check whether or not the device is in the dead battery state, it should be understood that the previously applied current may be utilized for at least one of the fifth current $I_5$ and the sixth current $I_6$.

FIG. 6 is an example of the rated device determination subroutine mentioned in FIG. 5. The rated device determination subroutine illustrated in FIG. 6 may be understood to more accurately determine whether or not a device connected to the connector 100 is a rated device by measuring the magnitude of the resistance component and/or the degree of change of the resistance component.

Referring to FIG. 6, the detection controller 140 may supply the fourth current $I_4$ to the first pin P1, and measure the voltages $V_{S4-1}$ and $V_{S4-2}$ of the first pin P1 at different time points, respectively (step S210). An example of the different time points may be a supply time point and a supply end time point of the fourth current $I_4$, but is not limited thereto. As described above, the fourth current $I_4$ may be continuously applied following the second current $I_2$ and the third current $I_3$ in step S110 of FIG. 5.

Then, the detection controller 140 may calculate the magnitude of the resistance component by using the fourth current $I_4$ and the voltages $V_{S4-1}$ and $V_{S4-2}$ (step S220), and may compare the calculated magnitude of the resistance component against a rated device resistance region to check whether or not it belongs the rated device resistance region (step S230). Illustratively, the magnitude of the resistance component may be calculated using either one of the two voltages $V_{S4-1}$ and $V_{S4-2}$, but it is preferable to use the later measured voltage $V_{S4-2}$ since a stable resistance value may be calculated.

When the calculated magnitude of the resistance component as a result of the comparison in step S230 falls within the rated device resistance region, the device may be determined as a rated device (step S280), and otherwise, determined as a non-rated device, and a procedure illustrated in FIG. 7 may be performed through an 'A' route.

According to an embodiment, even when the calculated magnitude of the resistance component as the result of the comparison in step S230 belongs to the rated device resistance region, the degree of change in the resistance component may be additionally reviewed to determine whether or not the device is a rated device (step S270). Illustratively, when the calculated magnitude of the resistance component as the result of the comparison in step S230 belongs to the rated device resistance region, the subroutine proceeds to step S270 (steps S240 and S250 will be described later), and the detection controller 140 may determine whether or not a value obtained by subtracting the fourth-first voltage $V_{S4-1}$ from the fourth-second voltage $V_{S4-2}$ is greater than a fourth threshold value (step S270), and may determine that the device is a rated device when the value obtained by subtracting the fourth-first voltage $V_{S4-1}$ from the fourth-second voltage $V_{S4-2}$ is not greater than the fourth threshold value (step S280). When the value obtained by subtracting the fourth-first voltage $V_{S4-1}$ from the fourth-second voltage $V_{S4-2}$ is greater than the fourth threshold value, it is determined that the device is a non-rated device, and a procedure illustrated in FIG. 7 may be additionally performed through the 'A' route.

The reason for considering the difference between the two voltages $V_{S4-1}$ and $V_{S4-2}$ when the determination as to the rated device is made as described above is that if the difference between the two voltages $V_{S4-1}$ and $V_{S4-2}$ is larger than the threshold value even if the magnitude of the resistance component is included in a rated device area, it means that the change in resistance value is large, which makes it possible to suspect an abnormal state such as a short circuit with other pins.

Next, steps S240 and S250, which have not been described above, will be described. Steps S240 and S250 are a process of determining whether or not an element connected to the connector 100 is a USB-C E-marked cable, and as illustrated in FIG. 6, may be selectively added between step S230 and step S270 as needed.

As a method of checking the USB-C E marked cable, when the second voltage VS2 measured when the second current $I_2$ described with reference to FIG. 5 is supplied is smaller than the first threshold voltage $V_{TH-CBL1}$ for cable determination, the third voltage $V_{S3}$ measured when the third current $I_3$ is supplied is less than the second threshold voltage $V_{TH-CBL2}$ for cable determination, and the fourth-second voltage $V_{S4-2}$ measured at the end of supply of the fourth current $I_4$ is less than a third threshold voltage $V_{TH-CBL3}$ for cable determination, the detection controller 140 may determine that the USB-C E-marked cable is connected to the connector 100 (step S250).

As described above, when it is determined in step S230 of FIG. 6 that the resistance component does not belong to the rated device resistance region or it is determined in step S270 that the difference between the fourth-second voltage $V_{S4-2}$ and the fourth-first voltage $V_{S4-1}$ is large, a procedure of FIG. 7 may be additionally performed as needed.

FIG. 7 illustrates a procedure for detecting a change in voltage over time in a state in which the supply of current to the first pin P1 of the connector 100 is stopped, and determining the presence or absence of various kinds of devices/components by using the detection, and may be understood as a 'foreign substance/device detailed determination subroutine'. Depending on the embodiment, the procedure of FIG. 7 may not be performed for a brief inspection, and in this case, the situation proceeding to 'A' in FIGS. 5 and 6 may be determined as 'there is a possibility of moisture or foreign substances other than moisture', and even with the determination, meaningful results may be provided to the user. Of course, when the procedure illustrated in FIG. 7 is performed, the kind of foreign substance/device may be determined more specifically, which is more preferable.

Referring to FIG. 7, the detection controller 140 may apply the fourth current $I_4$ in step S210 of FIG. 6, and then cut off the current source 110 for a predetermined time $T_{STP}$ in step S290 and measure the voltages $V_{STP-1}$ and $V_{STP-2}$ of the first pin P1 at a first cut-off time point $T_{STP1}$ and a second cut-off time point $T_{STP2}$, respectively (step S290). For example, the first cut-off time point may be immediately after starting cutting off, and the second cut-off time point may be immediately before ending cutting off, but the present embodiment is not limited thereto. According to an embodiment, a relatively large pull-down resistor may be connected while the detection current is cut off, in step S290.

Then, the detection controller 140 may substitute the first cut-off voltage $V_{STP-1}$ measured at the first cut-off time point $T_{STP1}$ and the second cut-off voltage $V_{STP-2}$ measured at the second cut-off time point $T_{STP2}$ into a predefined conditional expression, and may determine that the component/element connected/introduced to/into the connector 100 is at least one of a CC-VBUS short device, a gender conversion device, moisture, and a foreign substance other than moisture, depending on whether or not the conditional expression is satisfied.

According to an embodiment, the detection controller 140 determines whether or not the second cut-off voltage $V_{STP-2}$ is greater than a fifth threshold value (step S300), and when the second cut-off voltage $V_{STP-2}$ is not greater than the fifth threshold value, may determine that a foreign substance other than moisture is connected to the connector 100 (step S310).

When it is determined in step S300 that the second cut-off voltage $V_{STP-2}$ is greater than the fifth threshold value, the detection controller 140 may determine whether or not Equation 3 below is satisfied (step S320).

$$V_{STP-1} \times M_3 \geq V_{S4-2} \geq V_{STP-1} \times M_4 \quad \text{[Equation 3]}$$

Here, $M_3$ and $M_4$ each may be understood as margins for giving a tolerance for determining the USB Type-C connector, and $V_{S4-2}$ is a voltage measured at the second cut-off time point of the fourth current $I_4$ as described with reference to FIG. 6.

When it is determined in step S320 that Equation 3 is satisfied and the kind of connector 100 is USB Type-C, the procedure proceeds to step S330, where the detection controller 140 may determine that the device connected to the connector 100 is the CC-VBUS short device, and output determination information or transmit the determination information to an external device.

If Equation 3 is not satisfied in step S320, the detection controller 140 may determine whether or not Equation 4 below is satisfied (step S340).

$$V_{STP-2} \times M_5 \geq V_{STP-1} \geq V_{STP-2} \times M_6 \quad \text{[Equation 4]}$$

Here, $M_5$ and $M_6$ each may be understood as margins for giving a tolerance for determining whether or not the device is the gender conversion device.

When Equation 4 is satisfied and the kind of connector 100 is USB type-C, the procedure proceeds to step S350, where the detection controller 140 may determine that the device connected to the connector 100 is the gender conversion device, and output determination information or transmit the determination information to an external device.

If Equation 4 is not satisfied in step S340, the detection controller 140 may compare the magnitudes of the first cut-off voltage $V_{STP-1}$ and the second cut-off voltage $V_{STP-2}$ (step S360). In step S360, when the first cut-off voltage $V_{STP-1}$ and the second cut-off voltage $V_{STP-2}$ are not substantially the same (when the difference therebetween is large according to the embodiment), the procedure proceeds to step S370, where the detection controller 140 may determine that moisture is introduced into the connector 100, and output determination information or transmit the determination information to an external device (step S370).

Meanwhile, although not shown in FIG. 7, in step S360, when it is determined that the first cut-off voltage $V_{STP-1}$ and the second cut-off voltage $V_{STP-2}$ are not substantially the same, and the second voltage $V_{STP-2}$ is greater than the first cut-off voltage $V_{STP-1}$, a determination is made that there is a change in the connection state of the connector 100 and the detection process may be restarted.

Meanwhile, in FIG. 7, steps S300, S320, S340 and S360 are exemplified as being sequentially performed, but each of steps S300, S320, S340 and S360 may be performed individually or in parallel to each other after step S290. Alternatively, according to an embodiment, steps S300, S320, S340 and S360 may be sequentially performed in an order different from that illustrated in FIG. 7.

As described above, the method for detecting a foreign substance according to embodiments of the present invention may supply different levels of detection currents to the pin provided in the connector 100, measure the voltages of the pin, and compare the voltages with predetermined threshold values or conditions, thereby making it possible to more accurately determine moisture introduced into the connector 100, foreign substances other than moisture, a rated device, a non-rated device, a device in the dead battery state, and the like.

However, although the method following the sequence of FIGS. 4 to 7 has been exemplarily described as a preferred method for detecting a foreign substance according to an embodiment, the embodiment of the present invention does not necessarily have to be performed in that order. As long as the gist of the method for determining moisture, a foreign substance other than moisture, or various kinds of devices presented in the present specification is maintained, each method illustrated in FIGS. 4 to 7 may be performed without the preceding procedure described through FIGS. 4 to 7, or may be performed by changing the order.

Meanwhile, as a modified embodiment, when it is determined that moisture or a foreign substance other than moisture is present, additional verification may be performed through a second pin adjacent to the first pin. For example, the above-described method for detecting a foreign substance that is performed for the first pin may be applied to the second pin present in the connector 100 to be further verified in the same manner. Further, as an alternative, a detection current for simply detecting moisture or a foreign substance other than moisture may be supplied to the second pin, the voltage of the second pin is measured, and when the measured voltage is less than the second threshold value mentioned in step S60 of FIG. 4, a determination may be made that a foreign substance is introduced. In this case, only the foreign substance determination result using the first pin may be used, or both the foreign substance determination results using the first pin and the second pin may be combined for determination. For example, after performing the above-described method for the first pin, only the brief inspection illustrated in FIG. 4 may be performed on the second pin, and the determination for the first pin may be finally made by combining the inspection results for the first and second pins.

Figure 8:
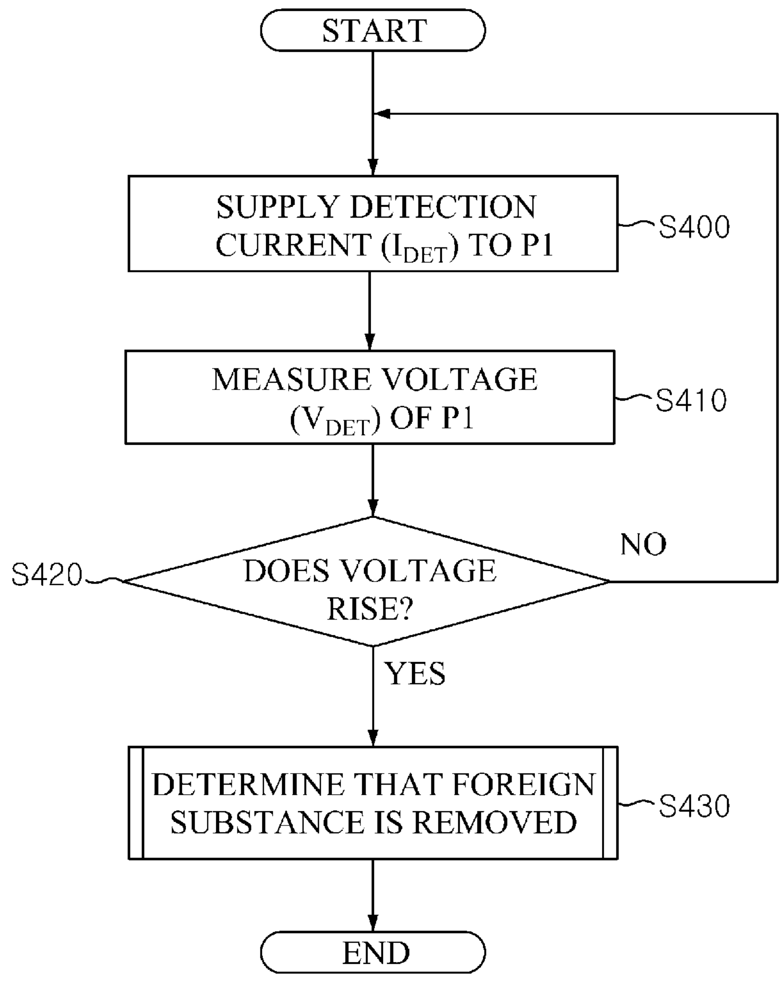
FIG. 8 illustrates the flow chart of a method for determining foreign substance removal according to an embodiment of the present disclosure.

Furthermore, the detection controller 140 of the foreign substance detection apparatus according to an embodiment of the present invention may further perform a foreign substance removal determination routine as shown in FIG. 8 in order to detect a time point when a normal operation is possible again after detecting the foreign substance.

Referring to FIG. 8, the detection controller 140 may supply a detection current $I_{DET}$ to the first pin P1 of the connector 100 (step S400), and may measure a voltage $V_{DET}$ of the first pin P1 (step S410). When it is determined that the measured voltage $V_{DET}$ is equal to or greater than a predetermined voltage (step S420), it is determined that the foreign substance is removed, and information about the determination may be output or transmitted to an external device (step S430).

In this case, continuously supplying the detection current $I_{DET}$ may cause corrosion, and thus it is preferable to perform the above-described foreign substance removal determination routine only for a predetermined time every predetermined period.

When one pin is used, the foreign substance removal determination routine may also be performed for the corresponding pin. In the case of using two pins, first, one targeted pin may be checked for whether or not a foreign substance is removed, and then a final determination as to whether or not foreign substance removal is completed may be made by performing the foreign matter removal determination routine for a remaining pin. Alternatively, according to an embodiment, the inspection is simultaneously performed on the two pins, and the inspection results on the two pins are combined to make a final determination.

In addition, the power supply device may be connected to the connector 100 due to the user's carelessness in a state in which moisture is detected. In order to prevent this situation, the detection controller 140 may periodically measure the voltage fluctuation of the first pin P1 during the period in which the detection current $I_{DET}$ is not supplied, determine that an external power supply device is connected when the voltage fluctuation (in particular, the voltage rise) is measured, and transmit such determination information to the processor of the electronic device to respond systematically.

Figure 9:
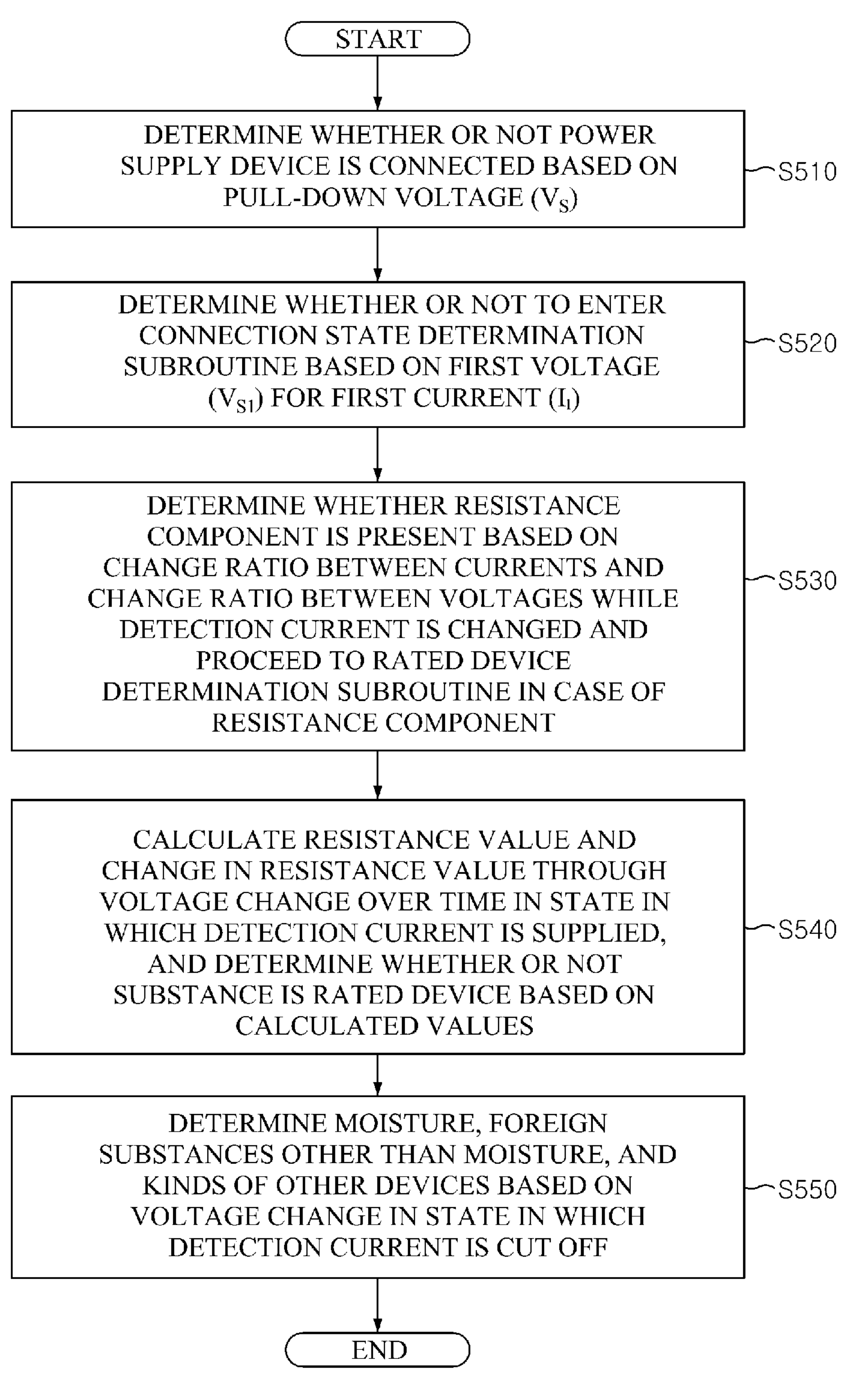
FIG. 9 schematically illustrates the flow chart of a method for detecting a foreign substance according to another embodiment of the present disclosure.

FIG. 9 schematically illustrates the method for detecting a foreign substance described with reference to FIGS. 4 to 7. In the following descriptions described with reference to FIG. 9, terms/symbols for voltage, current, or the like, may be understood to have the same meaning as the same terms/symbols described with reference to FIGS. 1 to 8 unless otherwise described.

As a first step S510, the method for detecting a foreign substance may determine whether or not the power supply device is connected based on the pull-down voltage $V_S$. To this end, the first step may include connecting a pull-down resistor to any one pin (first pin) of the connector 100, and determining whether or not a power supply device is connected to the connector 100 based on the measured pull-down voltage $V_S$ of the first pin P1. According to an embodiment, in the first step, it may be determined that a power supply device is connected to the first pin P1 when the pull-down voltage $V_S$ is greater than a first threshold value, and the method may proceed to a second step, to be described below, when the pull-down voltage $V_S$ of the first pin is not greater than the first threshold value.

As a second step S520, a determine as to whether or not to enter the connection state determination subroutine based on the first voltage $V_{S1}$ for the first current $I_1$ may be made. To this end, the second step may include determining whether or not to enter the connection state determination subroutine based on the first voltage $V_{S1}$ of the first pin P1 measured for the first current $I_1$ supplied to the first pin P1. According to an embodiment, in the second step, when the first voltage $V_{S1}$ of the first pin P1 is less than a second threshold value, the method may proceed to a third step, to be described later, for performing the connection state determination subroutine, and when the first voltage $V_{S1}$ of the first P1 is not less than the second threshold voltage, the method may return to the first step.

As a third step S530, the method for detecting a foreign substance may determine whether or not an attached substance is a resistance component based on the change ratio between currents and the change ratio between voltages while the detection current is changed, primarily determine that a rated device is likely to be connected when it is a resistance component, and determine that a rated device is not connected when it is not a resistance component. To this end, in the third step, a determination as to whether or not the substance attached to the first pin P1 is a resistance component may be made based on the second voltage $V_{S2}$ and the third voltage $V_{S3}$ of the first pin P1, which are measured by sequentially supplying the second current $I_2$ and the third current $I_3$ to the first pint P1. According to an embodiment, when the difference between the ratio of the second current $I_2$ to the third current $I_3$ and the ratio of the second voltage $V_{S2}$ to the third voltage $V_{S3}$ is smaller than a third threshold value, it may be determined that the rated device is likely to be connected to the first pin P1, and when the difference between the ratio of the second current $I_2$ to the third current $I_3$ and the ratio of the second voltage $V_{S2}$ to the third voltage $V_{S3}$ is not smaller than the third threshold value, it may be determined that a rated device is not connected to the first pin P1.

According to an embodiment, when the substance is determined as a resistance component in the third step, the procedure may proceed to the rated device determination subroutine for more precisely determining whether or not a rated device is connected. In addition, according to an embodiment, when it is not a resistance component, a determination as to whether or not a device in the dead battery state is connected to the first pin P1 may be made. According to an embodiment, when it is determined that the device in the dead battery state is not connected, the process may proceed to the foreign substance/device detailed determination subroutine.

As a fourth step S540, in a state in which the detection current is supplied, the resistance value and the change in the resistance value may be calculated through the voltage change over time, and a determination as to whether or not the device is a rated device may be made based on the calculated values. When it is primarily determined that the rated device is connected to the first pin P1 in the third step, the fourth step S540 may be selectively performed to more precisely determine whether or not the rated device is present. To this end, the fourth step S540 may include supplying the fourth current $I_4$ to the first pin P1, and determining whether or not a rated device is connected to the first pin P1 based on the fourth-first voltage $V_{S4-1}$ of the first pin P1 at a first time point after supplying the fourth current $I_4$ and the fourth-second voltage $V_{S4-2}$ of the first pin P1 at a second time point after supplying the fourth current $I_4$. For example, the first time point may be a supply start time of the fourth current $I_4$ and the second time point may be a supply end time of the fourth current $I_4$, but they are not limited thereto. According to an embodiment, the fourth step may include determining that the rated device is connected to the first pin P1 when a magnitude of the resistance component calculated using the fourth current $I_4$ and the fourth-second voltage $V_{S4-2}$ belongs to a resistance magnitude region of the rated device and a value obtained by subtracting the fourth-first voltage $V_{S4-1}$ from the fourth-second voltage $V_{S4-2}$ is not greater than a fourth threshold value.

As a fifth step (S550), moisture, foreign substances other than moisture, and/or the kind of device may be determined based on the voltage change in a state in which the detection current is cut off. According to an embodiment, a relatively large pull-down resistor may be connected to the first pin together with the cutting-off of the detection current. The fifth step S550 may be selectively performed to more specifically identify the kind of foreign substance/device when it is determined that the device is not a rated device in the fourth step S540 or is not in the dead battery state in the third step. Illustratively, the fifth step may be further performed when, in the fourth step, the magnitude of the resistance component calculated using the fourth current $I_4$ and the fourth-second voltage $V_{S4-2}$ does not belong to the resistance magnitude region of the rated device or the value obtained by subtracting the fourth-first voltage $V_{S4-1}$ from the fourth-second voltage $V_{S4-2}$ is greater than the fourth threshold value. According to an embodiment, the fifth step may include cutting off the current supplied to the first pin P1 through the current source, detecting a first cut-off voltage $V_{STP-1}$ of the first pin P1 at a first cut-off time point and a second cut-off voltage $V_{STP-2}$ of the first pin at a second cut-off time point through the detection circuit 130, determining that a foreign substance other than moisture is attached to the first pin P1 when the second cut-off voltage $V_{STP-2}$ is not greater than a fifth threshold value, and determining that moisture is attached to the first pin P1 when a difference between the first cut-off voltage $V_{STP-1}$ and the second cut-off voltage $V_{STP-2}$ is greater than a sixth threshold value. In addition, the fifth step may further include a procedure for determining a CC-VBUS short device or a gender conversion device.

Terms such as "include", "comprise", or "have" described above mean that the corresponding component can be present unless otherwise stated, and thus it should be construed that other components may be further included rather than excluding other components. All terms including technical or scientific terms have the same meaning as commonly understood by those of ordinary skill in the art to which the embodiments of the present invention belong, unless otherwise defined. Terms commonly used such as those defined in dictionaries should be interpreted as having a meaning that is consistent with their meaning in the context of the related art and will not be interpreted in an idealized or overly formal sense unless expressly so defined in the present invention.

The above description is merely illustrative of the technical idea of the present invention, and those of ordinary skill in the art to which the present invention pertains will be able to make various modifications and variations without departing from the essential characteristics of the present invention. Accordingly, the embodiments disclosed in the present invention are not intended to limit the technical idea of the present invention, but to explain the technical idea, and the scope of the technical idea of the present invention is not limited by these embodiments. The scope of protection of the present invention should be interpreted by the accompanying claims, and all technical ideas within the scope equivalent thereto should be construed as being included in the scope of the present disclosure.

The invention claimed is:

1. An apparatus for detecting a foreign substance or a device on a connector including at least a first pin, wherein the apparatus comprises:

a current source, wherein the current source supplies detection currents to the at least first pin of the connector, wherein the detection currents are set at different levels;

a detection circuit, wherein the detection circuit detects a voltage on the first pin; and a detection controller, wherein the detection controller controls the different levels of the detection currents supplied to the first pin and supply time points, and wherein the detection controller detects the foreign substance or the device attached to the connector by measuring the input voltage on the first pin from the detection circuit, wherein the detection circuit measures both of a second voltage ($V_{S2}$) on the first pin for a second current ($I_2$) and a third voltage ($V_{S3}$) on the first pin for a third current ($I_3$) that is different from the second current ($I_2$) by sequentially supplying the second current ($I_2$) and the third current ($I_3$) to the first pin through the current source via the connection state determination subroutine;

wherein the detection controller determines whether or not a substance attached to the first pin is a resistance component based on comparison of a ratio of the second current ($I_2$) to the third current ($I_3$) and a ratio of the second voltage ($V_{S2}$) to the third voltage ($V_{S3}$); and wherein the detection controller starts a rated device determination subroutine that determines that a rated device is connected to the first pin when the substance is the resistance component and determines that a rated device is not connected to the first pin when the substance is not the resistance component.

2. The apparatus of claim 1, wherein the first pin is connected to a pull-down resistor carrying a pull-down voltage ($V_S$), and wherein when the pull-down voltage ($V_S$) on the first pin is greater than a first threshold value, the detection controller determines that a power supply device is connected to the first pin.

3. The apparatus of claim 1, wherein when a first current ($I_1$) is supplied to the first pin, the first pin carries a first voltage ($V_{S1}$), if the first voltage ($V_{S1}$) is smaller than a second threshold value, the detection controller starts a connection state determination subroutine.

4. The apparatus of claim 1, wherein the detection controller supplies a fourth current ($I_4$) to the first pin through the current source, wherein the detection controller measures, through the detection circuit, a fourth-first voltage ($V_{S4-1}$) on the first pin at a first time point after supplying the fourth current ($I_4$) and a fourth-second voltage ($V_{S4-2}$) of the first pin at a second time point, after supplying the fourth current ($I_4$); and wherein the detection controller determines whether or not a rated device is connected based on a magnitude of a resistance component calculated using the fourth current ($I_4$) and the fourth-second voltage ($V_{S4-2}$) and a difference between the fourth-first voltage ($V_{S4-1}$) and the fourth-second voltage ($V_{S4-2}$).

5. The apparatus of claim 4, wherein the detection controller determines that the rated device is connected to the first pin when the magnitude of the resistance component calculated using the fourth current ($I_4$) and the fourth-second voltage ($V_{S4-2}$) belongs to a resistance magnitude region of the rated device and a value obtained by subtracting the fourth-first voltage ($V_{S4-1}$) from the fourth-second voltage ($V_{S4-2}$) is not greater than a fourth threshold value.

6. The apparatus of claim 1, wherein the detection controller cuts off a current supplied to the first pin through the current source, detects a first cut-off voltage ($V_{STP-1}$) on the first pin at a first cut-off time point and a second cut-off voltage ($V_{STP-2}$) on the first pin at a second cut-off time point through the detection circuit, determines that the foreign substance other than moisture is attached to the first pin when the second cut-off voltage ($V_{STP-2}$) is not greater than a fifth threshold value, and determines that the moisture is attached to the first pin when a difference between the first cut-off voltage ($V_{STP-1}$) and the second cut-off voltage ($V_{STP-2}$) is greater than a sixth threshold value.

7. The apparatus of claim 1, wherein when it is determined that the substance attached to the first pin is not a rated device, the detection controller sequentially supplies a fifth current ($I_5$) and a sixth current ($I_6$) to the first pin, detects a fifth voltage ($V_{S5}$) for the fifth current ($I_5$) and a sixth voltage ($V_{S6}$) for the sixth current ($I_6$), calculates a resistance value in each of the fifth current ($I_5$) and the sixth current ($I_6$), and determines that a device in a dead battery state is connected to the first pin when a resistance value for a large current among the fifth current ($I_5$) and the sixth current ($I_6$) is relatively small.

8. The apparatus of claim 1, wherein the detection controller determines that the substance attached to the first pin is the resistance component when a difference between the ratio of the second current ($I_2$) to the third current ($I_3$) and the ratio of the second voltage ($V_{S2}$) to the third voltage ($V_{S3}$) is smaller than a third threshold value.

9. The apparatus of claim 1, wherein the detection controller determines whether or not the substance connected to the first pin is in a dead battery state when the difference between the ratio of the second current ($I_2$) to the third current ($I_3$) and the ratio of the second voltage ($V_{S2}$) to the third voltage ($V_{S3}$) is not smaller than the third threshold value.

10. A method for detecting a foreign substance by an apparatus of detecting the foreign substance or a device connected to a connector, the method comprising:

a first step: determining, by a detection controller, if a power supply device is connected to a first pin of the connector, wherein the first pin is connected to a pull-down resistor carrying a pull-down voltage ($V_S$);

a second step: determining if the detection controller enters a connection state determination subroutine, based on a first voltage ($V_{S1}$) on the first pin measured after a first current ($I_1$) is supplied to the first pin; and a third step: determining if a substance attached to the first pin is a resistance component based on comparison of a ratio of the second current ($I_2$) to the third current ($I_3$) and a ratio of the second voltage ($V_{S2}$) to the third voltage ($V_{S3}$), wherein the second voltage ($V_{S2}$) and the third voltage ($V_{S3}$) on the first pin are measured after the second current ($I_2$) and the third current ($I_3$) that is different from the second current ($I_2$) are sequentially supplied to the first pin in the connection state determination subroutine, and determining if the detection controller should start a rated device determination subroutine that determines that a rated device is connected to the first pin when the substance is the resistance component and determines that a rated device is not connected to the first pin when the substance is not the resistance component.

11. The method of claim 10, wherein in the first step, the detection controller determines that the power supply device is connected to the first pin when the pull-down voltage ($V_S$) is greater than a first threshold value, and wherein the method proceeds to the second step when the pull-down voltage ($V_S$) of the first pin is not greater than the first threshold value.

12. The method of claim 10, wherein the method proceeds from the second step to the third step when the first voltage ($V_{S1}$) on the first pin is smaller than a second threshold value, and wherein the method returns from the second step to the first step when the first voltage ($V_{S1}$) is not smaller than the second threshold value.

13. The method of claim 10, wherein the third step further comprises:

determining that the substance attached to the first pin is the resistance component when a difference between the ratio of the second current ($I_2$) to the third current ($I_3$) and the ratio of the second voltage ($V_{S2}$) to the third voltage ($V_{S3}$) is smaller than a third threshold value, and determining if the substance connected to the first pin of the connector is in a dead battery state when the difference between the ratio of the second current ($I_2$) to the third current ($I_3$) and the ratio of the second voltage ($V_{S2}$) to the third voltage ($V_{S3}$) is not smaller than the third threshold value.

14. The method of claim 10, further comprising a fourth step, wherein the fourth step comprises:

supplying a fourth current ($I_4$) to the first pin in the rated device determination subroutine, and determining a rated device is connected to the first pin based on a fourth-first voltage ($V_{S4\text{-}1}$) of the first pin at a first time point after supplying the fourth current ($I_4$) and a fourth-second voltage ($V_{S4\text{-}2}$) of the first pin at a second time point after supplying the fourth current ($I_4$).

15. The method of claim 14, wherein in the fourth step, it is determined that the rated device is connected to the first pin when a magnitude of the resistance component calculated using the fourth current ($I_4$) and the fourth-second voltage ($V_{S4\text{-}2}$) belongs to a resistance magnitude region of the rated device and a value obtained by subtracting the fourth-first voltage ($V_{S4\text{-}1}$) from the fourth-second voltage ($V_{S4\text{-}2}$) is not greater than a fourth threshold value.

16. The method of claim 15, further comprising performing a fifth step, when the magnitude of the resistance component calculated using the fourth current ($I_4$) and the fourth-second voltage ($V_{S4\text{-}2}$) does not belong to the resistance magnitude region of the rated device or a value obtained by subtracting the fourth-first voltage ($V_{S4\text{-}1}$) from the fourth-second voltage ($V_{S4\text{-}2}$) is greater than the fourth threshold value, wherein the fifth step comprises:

cutting off the current supplied to the first pin, detecting a first cut-off voltage ($V_{STP\text{-}1}$) of the first pin at a first cut-off time point and a second cut-off voltage ($V_{STP\text{-}2}$) of the first pin at a second cut-off time point;

determining that the foreign substance other than moisture is attached to the first pin when the second cut-off voltage ($V_{STP\text{-}2}$) is not greater than a fifth threshold value; and determining that moisture is attached to the first pin when a difference between the first cut-off voltage ($V_{STP\text{-}1}$) and the second cut-off voltage ($V_{STP\text{-}2}$) is greater than a sixth threshold value.

17. The method of claim 13, wherein the determining if the device connected to the first pin of the connector is in the dead battery state comprises: sequentially supplying a fifth current ($I_5$) and a sixth current ($I_6$) to the first pin, detecting a fifth voltage ($V_{S5}$) for the fifth current ($I_5$) and a sixth voltage ($V_{S6}$) for the sixth current ($I_6$), calculating a resistance value in each of the fifth current ($I_5$) and the sixth current ($I_6$), and determining that the device in the dead battery state is connected to the first pin when the resistance value for a larger current between the fifth current ($I_5$) and the sixth current ($I_6$) is relatively small.

* * * * *